(12) United States Patent
Hallenberg et al.

(10) Patent No.: US 12,375,189 B2
(45) Date of Patent: Jul. 29, 2025

(54) OVER-THE-AIR TESTING OF AN ACTIVE ANTENNA SYSTEM

(71) Applicant: Telefonaktiebolaget LM Ericsson (publ), Stockholm (SE)

(72) Inventors: Henrik Hallenberg, Lindome (SE); Erik Nilsson, Ottawa (CA); Christian Heina, Gothenburg (SE); Dan Roos, Sävedalen (SE); Torbjörn Elfström, Fjärås (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 14 days.

(21) Appl. No.: 18/550,525

(22) PCT Filed: Mar. 16, 2021

(86) PCT No.: PCT/EP2021/056624
§ 371 (c)(1),
(2) Date: Sep. 14, 2023

(87) PCT Pub. No.: WO2022/033728
PCT Pub. Date: Feb. 17, 2022

(65) Prior Publication Data
US 2024/0322917 A1    Sep. 26, 2024

(51) Int. Cl.
*H04B 17/00*    (2015.01)
*H04L 5/00*    (2006.01)

(52) U.S. Cl.
CPC ....... *H04B 17/0085* (2013.01); *H04L 5/0023* (2013.01)

(58) Field of Classification Search
CPC ...... H04B 7/0617; H04B 17/12; H04B 7/086; H04B 7/088; H04B 7/0695;
(Continued)

(56) References Cited

U.S. PATENT DOCUMENTS 11,088,744 B1 *  8/2021  Hammond .......... H04W 56/001
11,863,241 B2 *  1/2024  Palally .................. H04B 7/0413
(Continued)

FOREIGN PATENT DOCUMENTS

WO    2018172451 A1    9/2018
WO    2020110004 A1    6/2020

OTHER PUBLICATIONS

International Search Report and Written Opinion dated Dec. 2, 2021 for International Application No. PCT/EP2021/056624 filed Mar. 16, 2021; consisting of 12 pages.
(Continued)

*Primary Examiner* — Eva Y Puente
(74) *Attorney, Agent, or Firm* — Weisberg I.P. Law, P.A.

(57) ABSTRACT

There is provided mechanisms for OTA testing of an AAS of an EUT. A method is performed by a network node. The method includes obtaining definition of a test signal to be transmitted or received by the EUT in accordance with a time/frequency resource grid. The method includes applying first beamforming weights to first selected resource elements of the time/frequency resource grid that give first beam directions according to a first type of configuration for first OTA testing of the AAS. The method includes applying second beamforming weights to second selected resource elements of the time/frequency resource grid that give second beam directions according to a second type of configuration for second OTA testing of the AAS. The method includes initiating transmission or reception of the test signal over the AAS using the time/frequency resource grid.

18 Claims, 9 Drawing Sheets

(58) Field of Classification Search
CPC .. H04B 17/0085; H04B 17/21; H04B 7/0456; H04B 7/0413; H01Q 1/243; H01Q 1/2283; H01Q 1/38; H01Q 1/48; H01Q 1/526; H01Q 21/24; H01Q 25/001; H01Q 3/24; H01Q 5/47; H04W 24/06; H04W 16/28; H04W 72/046; H04W 24/08; H04W 24/02; H04W 88/08; H04W 24/10; H04W 16/02
See application file for complete search history.

(56) References Cited

U.S. PATENT DOCUMENTS

| | | | | |
|---|---|---|---|---|
| 2021/0250791 | A1* | 8/2021 | Schmidt | H04B 17/30 |
| 2023/0029484 | A1* | 2/2023 | Göransson | H04B 7/0617 |
| 2023/0053354 | A1* | 2/2023 | Leather | H04B 7/06966 |
| 2023/0179385 | A1* | 6/2023 | Wang | H04L 5/0023 370/330 |
| 2024/0154681 | A1* | 5/2024 | Vieira | H04B 17/24 |

OTHER PUBLICATIONS

3GPP TS25.141V14.3.0; 3rd Generation Partnership Project; Technical Specification Group Radio Access Network; Base Station (BS) conformance testing (FDD) (Release 14); Sep. 2017; consisting of 256 pages.
3GPP TS25.141V15.4.0; 3rd Generation Partnership Project; Technical Specification Group Radio Access Network; Base Station (BS) conformance testing (FDD) (Release 15); Dec. 2018; consisting of 250 pages.
3GPP TS25.141V16.0.0; 3rd Generation Partnership Project; Technical Specification Group Radio Access Network; Base Station (BS) conformance testing (FDD) (Release 16); Dec. 2018; consisting of 274 pages.
3GPP TS36.141V15.2.0; 3rd Generation Partnership Project; Technical Specification Group Radio Access Network; Evolved Universal Terrestrial Radio Access Network (E-UTRA); Base Station (BS) conformance testing (Release 15); Mar. 2018; consisting of 437 pages.
3GPP TS36.141V15.11.0; 3rd Generation Partnership Project; Technical Specification Group Radio Access Network; Evolved Universal Terrestrial Radio Access (E-UTRA); Base Station (BS) conformance testing (Release 15); Dec. 2020; consisting of 516 pages.
3GPP TS36.141V16.8.0; 3rd Generation Partnership Project; Technical Specification Group Radio Access Network; Evolved Universal Terrestrial Radio Access (E-UTRA); Base Station (BS) conformance testing (Release 16); Dec. 2020; consisting of 504 pages.
3GPP TS37.141V15.13.0; 3rd Generation Partnership Project; Technical Specification Group Radio Access Network; NR, E-UTRA, UTRA, and GSM/EDGE; Multi-Standard Radio (MSR) Base Station (BS) conformance testing (Release 15); Dec. 2020; consisting of 231 pages.
3GPP TS37.141V16.8.0; 3rd Generation Partnership Project; Technical Specification Group Radio Access Network; NR, E-UTRA, UTRA, and GSM/EDGE; Multi-Standard Radio (MSR) Base Station (BS) conformance testing (Release 16); Dec. 2020; consisting of 246 pages.
3GPP TS37.141V17.0.0; 3rd Generation Partnership Project; Technical Specification Group Radio Access Network; NR, E-UTRA, UTRA, and GSM/EDGE; Multi-Standard Radio (MSR) Base Station (BS) conformance testing (Release 17); Dec. 2020; consisting of 246 pages.
3GPP TS37.145-1V15.8.0; 3rd Generation Partnership Project; Technical Specification Group Radio Access Network; Active Antenna System (AAS) Base Station (BS) conformance testing; Part 1: Conducted conformance testing (Release 15); Dec. 2020; consisting of 311 pages.
3GPP TS37.145-1V16.5.0; 3rd Generation Partnership Project; Technical Specification Group Radio Access Network; Active Antenna System (AAS) Base Station (BS) conformance testing; Part 1: Conducted conformance testing (Release 16); Dec. 2020; consisting of 325 pages.
3GPP TS37.145-1V17.0.0; 3rd Generation Partnership Project; Technical Specification Group Radio Access Network; Active Antenna System (AAS) Base Station (BS) conformance testing; Part 1: Conducted conformance testing (Release 17); Dec. 2020; consisting of 325 pages.
3GPP TS37.145-2V15.9.0; 3rd Generation Partnership Project; Technical Specification Group Radio Access Network; Active Antenna System (AAS) Base Station (BS) conformance testing; Part 2: radiated conformance testing (Release 15); Dec. 2020; consisting of 359 pages.
3GPP TS37.145-2V16.6.0; 3rd Generation Partnership Project; Technical Specification Group Radio Access Network; Active Antenna System (AAS) Base Station (BS) conformance testing; Part 2: radiated conformance testing (Release 16); Dec. 2020; consisting of 371 pages.
3GPP TS37.145-2V17.0.0; 3rd Generation Partnership Project; Technical Specification Group Radio Access Network; Active Antenna System (AAS) Base Station (BS) conformance testing; Part 2: radiated conformance testing (Release 17); Dec. 2020; consisting of 371 pages.
3GPP TS38.104V15.12.0; 3rd Generation Partnership Project; Technical Specification Group Radio Access Network; NR; Base Station (BS) radio transmission and reception (Release 15); Dec. 2020; consisting of 238 pages.
3GPP TS38.104V16.6.0; 3rd Generation Partnership Project; Technical Specification Group Radio Access Network; NR; Base Station (BS) radio transmission and reception (Release 16); Dec. 2020; consisting of 294 pages.
3GPP TS38.104V17.0.0; 3rd Generation Partnership Project; Technical Specification Group Radio Access Network; NR; Base Station (BS) radio transmission and reception (Release 17); Dec. 2020; consisting of 295 pages.
3GPP TS38.141-1V15.7.0; 3rd Generation Partnership Project; Technical Specification Group Radio Access Network; NR; Base Station (BS) conformance testing Part 1: Conducted conformance testing (Release 15); Sep. 2020; consisting of 220 pages.
3GPP TS38.141-2V15.8.0; 3rd Generation Partnership Project; Technical Specification Group Radio Access Network; NR; Base Station (BS) conformance testing Part 2: Radiated conformance testing (Release 15); Dec. 2020; consisting of 289 pages.
3GPP TS38.141-2V16.6.0; 3rd Generation Partnership Project; Technical Specification Group Radio Access Network; NR; Base Station (BS) conformance testing Part 2: Radiated conformance testing (Release 16); Dec. 2020; consisting of 373 pages.
3GPP TS38.141-2V17.0.0; 3rd Generation Partnership Project; Technical Specification Group Radio Access Network; NR; Base Station (BS) conformance testing Part 2: Radiated conformance testing (Release 17); Dec. 2020; consisting of 373 pages.
TSG-RAN Working Group 4 (Radio) meeting #78 R4-161037; Title: Test models for the radiated TX power equipment; Source: Ericsson; Agenda item: 6.2.3.3; Document for: Discussion; Date and Location: Feb. 15-19, 2016, Malta; consisting of 3 pages.
3GPP TS 38.521-1 V15.3.0; 3rd Generation Partnership Project; Technical Specification Group Radio Access Network; NR; User Equipment (UE) conformance specification; Radio transmission and reception; Part 1: Range 1 Standalone; (Release 15); Jun. 2019; consisting of 570 pages.
3GPP TS 38.521-1 V16.6.0; 3rd Generation Partnership Project; Technical Specification Group Radio Access Network; NR; User Equipment (UE) conformance specification; Radio transmission and reception; Part 1: Range 1 Standalone; (Release 16); Dec. 2020; consisting of 983 pages.
3GPP TS 38.521-2 V15.3.0; 3rd Generation Partnership Project; Technical Specification Group Radio Access Network; NR; User Equipment (UE) conformance specification; Radio transmission and reception; Part 2: Range 2 Standalone (Release 15); Jun. 2019; consisting of 283 pages.
3GPP TS 38.521-2 V16.6.0; 3rd Generation Partnership Project; Technical Specification Group Radio Access Network; NR; User

(56) References Cited

OTHER PUBLICATIONS

Equipment (UE) conformance specification; Radio transmission and reception; Part 2: Range 2 Standalone (Release 16); Dec. 2020; consisting of 577 pages.
3GPP TS 38.521-3 V15.3.0; 3rd Generation Partnership Project; Technical Specification Group Radio Access Network; NR; User Equipment (UE) conformance specification; Radio transmission and reception; Part 3: Range 1 and Range 2 Interworking operation with other radios; (Release 15); Jun. 2019; consisting of 455 pages.
3GPP TS 38.521-3 V16.6.0; 3rd Generation Partnership Project; Technical Specification Group Radio Access Network; NR; User Equipment (UE) conformance specification; Radio transmission and reception; Part 3: Range 1 and Range 2 Interworking operation with other radios; (Release 16); Dec. 2020; consisting of 667 pages.

* cited by examiner

OVER-THE-AIR TESTING OF AN ACTIVE ANTENNA SYSTEM

CROSS-REFERENCE TO RELATED APPLICATION

This application is a Submission Under 35 U.S.C. § 371 for U.S. National Stage Patent Application of International Application Number: PCT/EP2021/056624, filed Mar. 16, 2021 entitled "METHOD AND NETWORK NODE FOR OVER-THE-AIR TESTING OF AN ACTIVE ANTENNA SYSTEM," the entirety of which is incorporated herein by reference.

TECHNICAL FIELD

Embodiments presented herein relate to a method, a network node, a computer program, and a computer program product for Over-The-Air (OTA) testing of an Active Antenna System (AAS) of an Equipment Under Test (EUT).

BACKGROUND

AAS is a term used to describe radio base stations, or other types of access network nodes, that incorporate a large number of separate transmitters and antenna elements that can be used for multiple input multiple output (MIMO) communication and beamforming as an integrated product. Transmissions from the access network node are expected to take place within higher frequency bands currently used. At such high frequency bands, such as in the microwave or millimeter-wave regions, propagation losses are greater than in currently used frequency bands. In order to achieve link budgets required for high data rates, beamforming might therefore be necessary.

In access network nodes equipped with an AAS, the physical access to the Antenna Reference Point (ARP), also known as Transceiver Array Boundary (TAB), will be limited or it will not be available. Hence, there will not be any possibility to carry out conducted measurements found in the conformance test requirements included in traditional specifications (e.g. as specified in the following publications from the third generation partnership project (3GPP): 3GPP TS 25.141, 3GPP TS 36.141, 3GPP TS 37.141 and 3GPP TS 37.145-1). OTA testing may therefore be the only way of verifying RF characteristics, such as radiated transmit power and radiated unwanted emission, etc.

In release 13 (Rel-13) of 3GPP TS 37.145-2, a limited number of OTA requirements have been introduced (radiated transmit power and OTA sensitivity). Release 15 (Rel-15) of 3GPP TS 37.145-2 and 3GPP TS 38.141-2 hold a complete OTA test specification for frequency regions FR1 (430 MHz to 7125 MHz) and FR2 (24 to 52 GHz). From a practical perspective FR1 is often divided into two sub-ranges called Low Band (LB) and Mid Band (MB) and FR2 is called High Band (HB). This means that RF parameters need to be tested in normal environmental conditions and some requirements are specified for testing in extreme environmental conditions. Specific parameters, such as radiated transmit power, radiated unwanted emission. OTA sensitivity and frequency stability that today are measured conducted, will have to be measured OTA. When conducting OTA testing, absolute radiated power will correspond to Equivalent Isotropic Radiated Power (EIRP) and absolute received power will correspond to Equivalent Isotropic Sensitivity (EIS).

Conditions applicable for normal condition and extreme conditions are defined by 3GPP in 3GPP TS 37.145-2 and 3GPP TS 38.141-2. Based on design quality assurance and other requirement the scope of extreme conditions could extend to also include vibration and extreme power supply characteristics when testing of RF characteristics is conducted. For receiver sensitivity there is no specific regulatory requirement to measure during extreme conditions, but it can be expected that customers will request such information. In some geographical regions or jurisdictions, regulators defines receiver requirements that indirectly includes receiver sensitivity to be measured.

Current specifications from RAN4 (radio access network work group radio performance and protocol aspects) relevant for base station RF core requirements and conformance test requirements have defined a concept of testing spatial characteristics for down-link (DL) and up-link (UL). The concept defined to capture spatial characterizes is built around declaration of a set of EIRP and EIS for a set of directions. The exact direction as well as the actual EIRP or EIS is declared by the manufacturer and is unique for a specific access network node implementation. The requirement pass-and-fail criteria is defined so that the declared EIRP or EIS is met within given measurement uncertainty in 3GPP TS 37.145-2 for Multi-Standard Radio (MSR) and in 3GPP TS 38.141-2 for New Radio (NR). During the specified OTA conformance testing, specified test signals are used (for DL test models and for UL fixed reference channels). The specified test signals define the actual signal to be used during the test in the frequency domain and the time domain. However, the spatial aspects to be able to generate different beam directions during the test is not specified. To be able to fulfil the requirements in 3GPP TS 37.145-2 and 3GPP TS 38.141-2, the access network node manufacturer must be able to apply test beam forming weight vectors associated to declared beam directions (summarized in 3GPP TS 37.145-2, subclause 4.10 and in 3GPP TS 38.141-2, subclause 4.6).

In 3GPP TS 37.145-2 and 3GPP TS 38.141-2 a minimum scope of beam directions to be tested.

Unlike the conformance test specifications for the user equipment (as given in 3GPP TS 38.521), the conformance test specifications for the access network node (as given in 3GPP TS 38.141-1 and TS 38.141-2) do not specify any test interfaces, i.e., any interfaces for injecting, or controlling application of, test signals. Only test signals and test conditions are currently specified for RF requirements. Test models are defined in 3GPP TS 37.145-2, subclause 4.12.2 and in 3GPP TS 38.141-2, subclause 4.9.2.

However, the capabilities of the radio and antenna hardware and software are getting more advanced for every new 3GPP release. As an example, in NR (5G), the waveform is much more flexible and support for Active Antenna (System) have been added, which increases the demand for more advanced test interfaces. Also, in other forums such as the Open RAN (O-RAN) alliance and the Next Generation Mobile Networks (NGMN) alliance, proposals have been made for new test functions. For NR, the concepts for testing used for Long Term Evolution (LTE) have been kept. But to be able to test OTA requirements for NR, new test functions, methods and interfaces are required.

Hence, there is still a need for an improved OTA testing of an AAS.

SUMMARY

An object of embodiments herein is to address the above issues by providing techniques for efficient, in terms of implementation complexity and time constraints, OTA testing of an AAS.

According to a first aspect there is presented a method for OTA testing of an AAS of an EUT. The method is performed by a network node. The method comprises obtaining definition of a test signal to be transmitted or received by the EUT in accordance with a time/frequency resource grid. The method comprises applying first beamforming weights to first selected resource elements of the time/frequency resource grid that give first beam directions according to a first type of configuration for first OTA testing of the AAS. The method comprises applying second beamforming weights to second selected resource elements of the time/frequency resource grid that give second beam directions according to a second type of configuration for second OTA testing of the AAS. The method comprises initiating transmission or reception of the test signal over the AAS using the time/frequency resource grid.

According to a second aspect there is presented a network node for OTA testing of an AAS of an EUT. The network node comprises processing circuitry. The processing circuitry is configured to cause network node to obtain definition of a test signal to be transmitted or received by the EUT in accordance with a time/frequency resource grid. The processing circuitry is configured to cause network node to apply first beamforming weights to first selected resource elements of the time/frequency resource grid that give first beam directions according to a first type of configuration for first OTA testing of the AAS. The processing circuitry is configured to cause network node to apply second beamforming weights to second selected resource elements of the time/frequency resource grid that give second beam directions according to a second type of configuration for second OTA testing of the AAS. The processing circuitry is configured to cause network node to initiate transmission or reception of the test signal over the AAS using the time/frequency resource grid.

According to a third aspect there is presented a network node for OTA testing of an AAS of an EUT. The network node comprises an obtain module configured to obtain definition of a test signal to be transmitted or received by the EUT in accordance with a time/frequency resource grid. The network node comprises an apply module configured to apply first beamforming weights to first selected resource elements of the time/frequency resource grid that give first beam directions according to a first type of configuration for first OTA testing of the AAS. The network node comprises an apply module configured to apply second beamforming weights to second selected resource elements of the time/frequency resource grid that give second beam directions according to a second type of configuration for second OTA testing of the AAS. The network node comprises an initiate module configured to initiate transmission or reception of the test signal over the AAS using the time/frequency resource grid.

According to a fourth aspect there is presented a computer program for OTA testing of an AAS of an EUT, the computer program comprising computer program code which, when run on a network node, causes the network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient, in terms of implementation complexity and time constraints, OTA testing of an AAS.

Advantageously, these aspects enable a large reduction in test time for AAS system testing. Currently there are some limitations in number of beams for each measurement. These are mainly a restriction on the instrument side, but the proposed aspects are not restricted to a maximum number of beams. Test model patterns can in general be extended over more than one radio frame.

Advantageously, including several beams in the same test signals makes it possible to measure parameters that require a phase relationship (such as orthogonality) and changing between beams (i.e., transient beam behavior).

Advantageously, these aspects enable the AAS to be tested in a way that is more closely related to how it actually works instead of applying custom beamforming weights to the beam form.

Advantageously, these aspects enable spatial characteristics to be tested regardless of the base station types (BS type 1-C, BS type 1-H, BS type 1-O and BS type 2-0) specified in 3GPP TS 38.104, subclause 4.6.

Advantageously, these aspects enable spatial characteristics to be tested regardless of what beamforming technology (analog, digital or hybrid beamforming) that have been adopted.

Advantageously, these aspects enable the overall accuracy of the testing to be improved due to lowering the risk of drift over time from factors such as temperature.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

Figure 1:
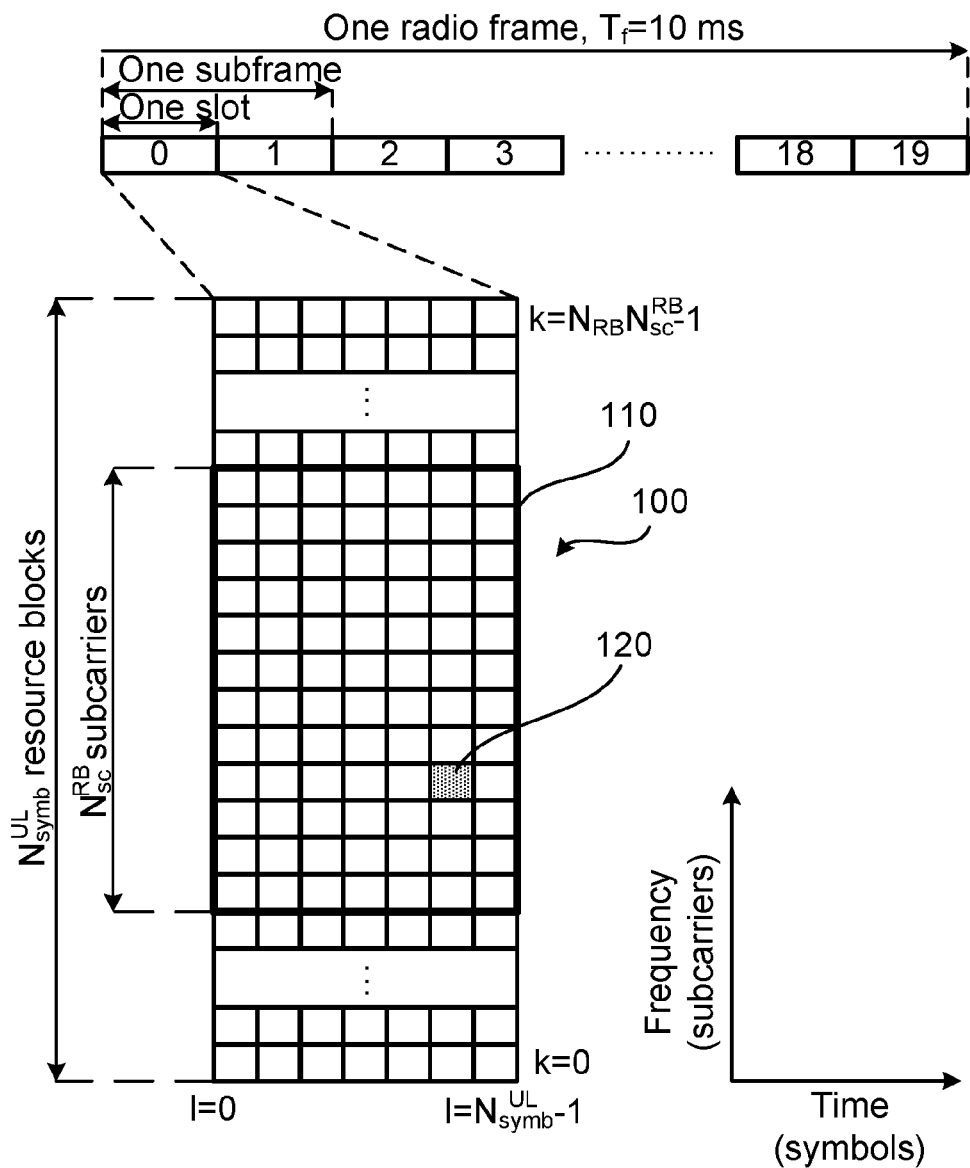
FIG. 1 schematically illustrates a time/frequency resource grid 100 according to an example.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above still a need for an improved OTA testing of an AAS.

Further in this respect, current testing of multi-beam systems is very time consuming since the testing must be performed beam-by-beam. Every set of beamforming weights needs to be loaded sequentially, which takes a substantial amount of time. This time is largely due to the communication and any potential transfer of beamforming weights between the equipment under test and any control unit. This usually consists of multiple commands needed to be communicated back and forth between the equipment under test and the control unit.

Further, depending on the equipment under test, the carrier might have to be restarted and/or calibration could be impacted. This implies that it needs to be ensures that the AAS is phase aligned before continuing. The time to update the beamforming weights may be a major contributor to the overall time considering many beams and angles to measure.

Along with the aforementioned time constraint, some AAS functionality remains untested, such as ensuring that the change between beams occurs within the allocated time (transient beam behavior) and the ability for the AAS to produce different beams without requiring a carrier take down.

Some antenna system parameters (such as orthogonality) cannot be tested with existing techniques since measurement of both amplitude and phase data for some baseband channels ('signals') are needed.

Additionally, there is a mechanical limitation in the movement between angles of the equipment under test. This limitation can only be improved so far before mechanical failure or higher uncertainty is introduced.

With the previously mentioned loading time of beamforming weights it is often better to physically move the equipment under test to all positions before loading new beamforming weights. Thus, when performing tests beam-by-beam, the movement of the equipment under test will always account for a large part of the test time.

As an illustrative example, assume the parameter values as given in Table 1:

TABLE 1 parameters and values for testing

| Parameter | Value |
|---|---|
| Setup time | 60 s |
| Measurement time | 0.2 s |
| Movement time(*) | 1.1 s |
| Number of positions(**) | 360 |
| Number of polarizations | 2 |

(*)The movement time refers to movement of the equipment under test from one angle to the next, not including communication time between the equipment under test and the control unit, and can be expressed as:

$$time = \frac{\frac{velocity}{acceleration} + \frac{velocity}{deceleration}}{2} + \frac{distance}{velocity}.$$

(**)Assuming a 1-degree step, single cut. The total time for testing all 360 beams is equal to: Setup time + Measurement time · Positions + Measurement Time · Polarizations · Positions. With the above parameter values, the total time equals 60 s + 0.2 s · 2 · 360 + 1.1 s · 360 = 600 s (i.e., 10 minutes).

The movement time is thus several times longer than the measurement time. By removing the setup time and the measurement time there will still be 396 seconds spent on just movement of the equipment under test. This means that no matter how fast the setup and the measurements are, it will still take at least 396 seconds for all beams to be tested.

Finally, AASs and radio equipment have previously been tested separately. The radio equipment would be tested according to the conducted method described in 3GPP TS 25.141, 3GPP TS 36.141, 3GPP TS 37.141 and 3GPP TS 37.145-1, whilst the AAS would be tested in a passive method which would verify the static beam shape. This method has the drawback where the entire system is not tested together and the end to end system is not verified. This is especially disadvantageous for testing AASs where the beam shape changes depending on the direction of the user equipment relative the access network node, which would be completely missed in the conducted measurement and would not be able to be done with the passive test method.

An object of the herein disclosed embodiments is to address these issues by enable measurements of multiple beams.

The embodiments disclosed herein in particular relate to mechanisms for OTA testing of an AAS of an EUT. In order to obtain such mechanisms there is provided a network node, a method performed by the network node, a computer program product comprising code, for example in the form of a computer program, that when run on a network node, causes the network node to perform the method.

The herein disclosed embodiments are based on using a time/frequency resource grid. FIG. 1 schematically illustrates a time/frequency resource grid 100 according to an example. The time/frequency resource grid 100 consists of resource blocks, one of which is illustrated at reference numeral 110. Each resource block spans a number of sub-carriers in the frequency domain. In turn, each resource block consists of resource elements, one of which is illustrated at reference numeral 120. In general terms, the resource element is the smallest defined unit which consists of one subcarrier during one symbol interval. There could be different types of time/frequency resource grids 100. In this respect, the time/frequency resource grid 100 might be for the transmission or reception of the test signal over an LTE air interface, or an NR air interface. As illustrated in FIG. 1, signals as defined by the time/frequency resource grid 100 are transmitted in each slot. According to the illustrative example of FIG. 1, two slots define one subframe, and ten subframes (i.e., 20 slots) define one radio frame.

Figure 2:
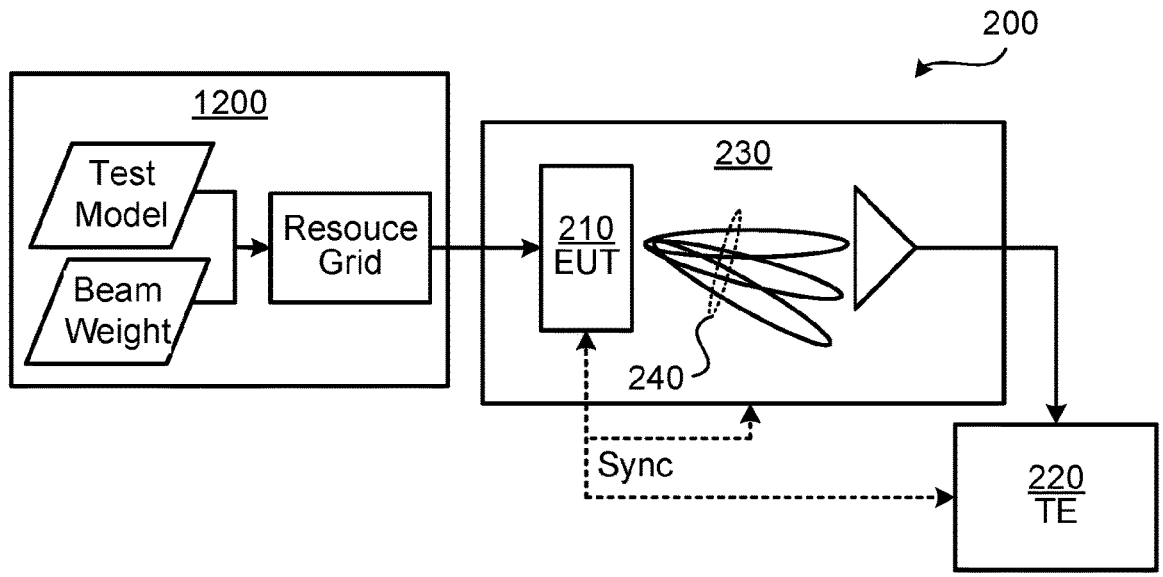
FIG. 2 is a block diagram of a system according to embodiments.

FIG. 2 is a block diagram of a system 200 according to the herein disclosed embodiments. The system 200 comprises a network node 1200, an EUT 210, and a test equipment (TE) 220. In turn, the EUT 210 comprises an AAS. In some examples the AAS of the EUT 210 is mounted to a positioner system that can position the AAS in any theta-phi direction in a spherical coordinate system. In some aspects, the system 200 defines a general set-up for OTA testing of the AAS of the EUT 210. Optionally, movement of at least one of the EUT 210 and the TE 220 is controlled by a test chamber controller. There could be different devices in which the EUT 210 is provided. In some non-limiting examples, the EUT 210 is, or is part of, either an access network node or a user equipment. In further non-limiting examples, the EUT 210 is, or is part of, a radar device, or a vehicle (such as an automotive vehicle, a vessel, or an aircraft).

Test signals are transmitted and received between the EUT 210 and the TE 220 in an OTA environment 230. In some examples the OTA environment 230 is enclosed by a chamber. Test signals might be transmitted either from the EUT 210 towards the TE 220 whereby transmitting properties of the EUT 210 are tested or from the TE 220 towards the EUT 210 whereby receiving properties of the EUT 210 are tested. As will be further disclosed below, definition of a test signal to be transmitted or received by the EUT 210 is obtained by the network node 1200 and the beamforming weights are at the network node 1200 applied to resource elements of a time/frequency resource grid 100 for transmission or reception of the test signal over the AAS using the time/frequency resource grid 100. The test signal and beamforming weights can thus by the network node 1200 be injected into the EUT 210.

A signal might be transmitted from the EUT 210 towards the TE 220 in several beams 240 during a radio frame. In this respect, beams 240 as generated by application of beamforming weights are used by the EUT 210 for transmission or reception of the test signals at the EUT 210. The TE 220 might then use a Spectrum Analyzer (SA) to analyze in-phase quadrature (IQ) data of the signal as received by the TE 220 so as to estimate the amplitude/phase per beam. This process can be performed for different theta-phi directions to get the spatial performance of the EUT 210 (or its AAS). Post processing can then be applied to extract beam properties defined in the time/frequency resource grid 100. By analyzing the IQ data instead of just measuring radio frequency power, enables the IQ data to be de-modulated and amplitude/phase of every individual beam to be extracted. The same principles can be applied when a test signal is transmitted from the TE 220 towards the EUT 210, but with a Signal Generator (SG) at the TE 220 as transmitter and post processing by means of tracing out amplitude/phase per beam type at baseband in the EUT 210. Accordingly, this enables measurements to be made on multiple beams simultaneously by using a suitable time/frequency resource grid.

Figure 3:
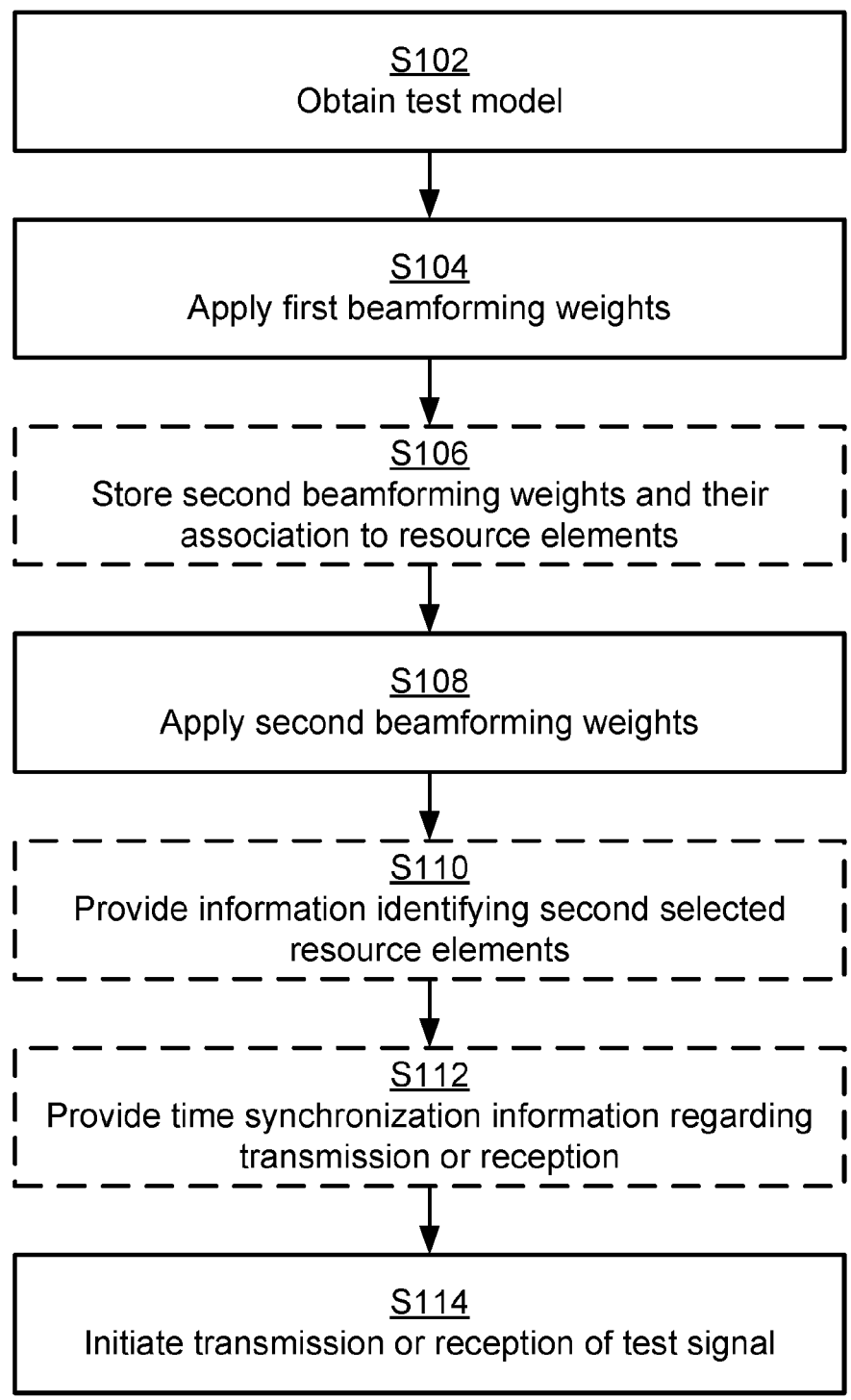
FIG. 3 is a flowchart of methods according to embodiments.

FIG. 3 is a flowchart illustrating embodiments of methods for OTA testing of an AAS of an EUT 210. The methods are performed by the network node 1200. The methods are advantageously provided as computer programs 1420.

In general terms, the method is based on that beamforming weights are configured on a time/frequency resource grid 100 for a test signal, whereby a spatial information layer is added to the resource grid 100. Signaling as defined by the time/frequency resource grid 100 is then transmitted or received by the AAS.

S102: The network node 1200 obtains definition of a test signal to be transmitted or received by the EUT 210 in accordance with a time/frequency resource grid 100. In some examples, the test signal is defined by, or specified by, a test model. Hence, in some aspects, the definition of the test signal is obtained by means of a test model according to which the test signal is defined, or specified.

S104: The network node 1200 applies first beamforming weights to first selected resource elements 120 of the time/frequency resource grid 100 that give first beam directions according to a first type of configuration for first OTA testing of the AAS. In other words, the first selected resource elements are selected to the first type of configuration to give the first beam directions. The term "selected" is here used to denote that the first beamforming weights are not applied to all available resource elements, but only to some purposely selected resource elements 120 of the time/frequency resource grid 100.

S108: The network node 1200 applies second beamforming weights to second selected resource elements 120 of the time/frequency resource grid 100 that give second beam directions according to a second type of configuration for second OTA testing of the AAS. The term "selected" is here used to denote that the second beamforming weights are not applied to all available resource elements, but only to some purposely selected resource elements 120 of the time/frequency resource grid 100.

S114: The network node 1200 initiates transmission or reception of the test signal over the AAS using the time/frequency resource grid 100. In this respect, the actual OTA transmission or reception of the test signal is performed by the EUT 210 or its AAS.

This method enables measurements for a large number of beams to be performed within a short time span.

Advantageously, this method provides efficient, in terms of implementation complexity and time constraints, OTA testing of an AAS Advantageously, this method enables a large reduction in test time for AAS system testing. Currently there are some limitations in number of beams for each measurement. These are mainly a restriction on the instrument side, but the proposed aspects are not restricted to a maximum number of beams. Test model patterns can in general be extended over more than one radio frame.

Advantageously, including several beams in the same test signals makes it possible to measure parameters that require a phase relationship (such as orthogonality) and changing between beams (i.e., transient beam behavior).

Advantageously, this method enables the AAS to be tested in a way that is more closely related to how it actually works instead of applying custom beamforming weights to the beam form.

Advantageously, this method enables spatial characteristics to be tested regardless of the base station types (BS type 1-C, BS type 1-H, BS type 1-O and BS type 2-0) specified in 3GPP TS 38.104, subclause 4.6.

Advantageously, this method enables spatial characteristics to be tested regardless of what beamforming technology (analog, digital or hybrid beamforming) that have been adopted.

Advantageously, this method enables the overall accuracy of the testing to be improved due to lowering the risk of drift over time from factors such as temperature.

Advantageously, by applying different beamforming weights for individual resource elements in the resource grid regardless of symbol, this method enables different beams to be placed in the time/frequency resource grid 100. These beams are then extracted from the time/frequency resource grid 100 in the instrument or base station, depending on the measurement.

In view of the above, the herein disclosed embodiments can make use of the multi-beam nature of the LTE and NR radio frame structure, defined by the time/frequency resource grid 100, as in the example of FIG. 1. For both digital and analog beamforming, the network node 1200 in operation continuously applies different beamforming weights, in terms of complex numbers, that determine the amplitude and phase of each antenna branch of the transmitted or received signal, on transmitted and received signals in different beams.

By expanding the concept of LTE/NR test models defined in 3GPP specifications (3GPP TS 37.145-2 for MSR and 3GPP TS 38.141-2 for NR) by an addition of a spatial component, in terms of the second beamforming weights, applied to the time/frequency resource grid 100, the beam direction can be controlled efficiently during the OTA testing of the EUT 210. The beamforming weights are applied on resource elements (symbols) in a known pattern, and the test signal will then contain several beams.

Applying the second beamforming weights does not change the statistical behavior (e.g. Peak to Average Power Ratio (PAPR)) during the OTA testing. The test signals in 3GPP (test models and Fixed Reference Channel (FRC)) are defined per TAB port without any consideration of beamforming aspects. The embodiments disclosed herein are based on the fact that beamforming weights are not defined for the test model and FRC in 3GPP, where the herein disclosed embodiments enable the addition of a spatial component, in terms of the second beamforming weights, to speed up the OTA testing.

Embodiments relating to further details of OTA testing of an AAS of an EUT 210 as performed by the network node 1200 will now be disclosed.

There could be different ways in which the test signal is transmitted or received in step S114. In this respect, the EUT 210 might be configured for either time-division duplex (TDD) operation or frequency-division duplex (FDD) operation, or a combination of TDD operation and FDD operation.

There could be different types of configurations. In some embodiments, the first type of configuration is a default configuration for default OTA testing of the AAS and the second type of configuration is a custom configuration for custom OTA testing of the AAS. This enables default OTA testing of the AAS to be seamlessly combined with customized OTA testing of the AAS.

Aspects relating to the beamforming weights will now be disclosed.

In some examples, the first beamforming weights are defined to meet conformance directions stipulated by the 3GPP. In some examples there are exactly five such conformance directions.

There could be different ways in which the second beamforming weights are determined. In some embodiments, the second beamforming weights are defined by an index to a beamforming codebook or determined from measurements on received reference signals. Received reference signals are thus reference signals received OTA by the EUT 210, where the measurements are made either by the EUT 210 or the network node 1200. In some examples, the second beamforming weights are defined to meet codebook generated beam directions of beams defined in a Grid of Beams configuration. For a system using reciprocity beamforming, a fine grid of test beams can be created to characterize the system. In some examples, the second beamforming weights correspond to customer specific beams to give the customer finer information about the equipment under test required for cell planning.

In some aspects the second beamforming weights, and to which second selected resource elements 120 they are applied, are stored for future use. Hence, in some embodiments, the network node 1200 is configured to perform (optional) step S106:

S106: The network node 1200 stores the second beamforming weights and their association to the second selected resource elements 120. The association could here thus represent a mapping that describes which second beamforming weights are applied to which second selected resource elements 120.

Storing the beams on top of the time/frequency resource grid 100 allows rapid reading of the read of data, typically matched to the sample rate of analog to digital (ADC) conversion and digital to analog (DAC) conversion in the radio equipment. The upload of the beamforming weights can be made slower in time since the beamforming weights typically can be generated offline.

As disclosed above, the second beamforming weights are applied to second selected resource elements 120 of the time/frequency resource grid 100. There could be different ways to select these resource elements. In some embodiment, the second beamforming weights are applied to the second selected resource elements 120 representing CRS symbols, CSI-RS symbols and PDSCH symbols, or to the second selected resource elements 120 representing broadcast symbols (such as SSB or BCH symbols). As a non-limiting example, the second beamforming weights are applied to the second selected resource elements 120 representing four CRS symbols, eight CSI-RS symbols, and/or ten PDSCH traffic symbols.

Thus, as an illustrative example, for LTE FDD, the 3GPP defined test model E-TM1.1 (defined in 3GPP TS 37.145-2, subclause 4.12.2 for LTE and correspondingly for NR defined in 3GPP TS 38.141-2, subclause 4.9.2) can be expanded in a way such that four CRS symbols plus eight CSI-RS symbols are transmitted and PDSCH beamforming weights are set by having one unique codebook index per subframe. This defines a test model containing 4+8+10=22 different simultaneous beams.

In some aspects, the second beamforming weights applied to PDSCH traffic or broadcast symbols are set to a different beam from frame to frame. Particularly, in some embodiments, the test signal is transmitted or received in frames, and the second beamforming weights applied to the second selected resource elements 120 representing PDSCH symbols differ from frame to frame. Thus, as an illustrative example, for NR TDD Frequency Range 2 (FR2) the 3GPP defined test model NR-FR2-TM1.1 (3GPP TS 38.141-2, subclause 4.9.2) is expanded in a way such that PDSCH beamforming weights for each slot are set to a different beam in the available grid of beams. This can then be stacked in multiple frames for upwards of 1024 different simultaneous beams.

With further respect to the second selected resource elements 120, information that identify these resource elements might be communicated as side information to a test equipment (TE) 220 intended to receive or transmit the test signal. Hence, in some embodiments, the network node 1200 is configured to perform (optional) step S110:

S110: The network node 1200 provides information identifying the second selected resource elements 120 of the time/frequency resource grid 100 to a test equipment (TE) 220 intended to receive or transmit the test signal.

In some aspects, the transmission or reception of the test signal over the AAS is synchronized with a test chamber controller of a test chamber in which the test signal is intended to be transmitted or received. Hence, in some embodiments, the network node 1200 is configured to perform (optional) step S112:

S112: The network node 1200 provides time synchronization information regarding the transmission or reception of the test signal over the AAS to a test chamber controller of a test chamber in which the test signal is intended to be transmitted or received.

Aspects of how the test signal might be transmitted or received in step S114 will now be disclosed.

In general terms, application of the first beamforming weights and the second beamforming weights causes the test signal to be transmitted or received in beams 240. That is, in some embodiments, the test signal is, in accordance with the first beamforming weights and the second beamforming weights, transmitted or received in beams 240. Each beam might then contain information about its placement within the time/frequency resource grid 100. Hence, in some embodiments, the test signal as transmitted or received in each of the beams 240 contains information about which resource elements that had used by which beamforming weights within the time/frequency resource grid 100.

Further in this respect, each beam 240 might contain amplitude and phase information for each antenna port. In particular, in some embodiments where the test signal is transmitted or received on antenna ports of the AAS and the first beamforming weights and the second beamforming weights are defined in terms of amplitude and phase information, the test signal as transmitted or received in each of the beams 240 contains the amplitude and phase information for each of the antenna ports.

Different realizations of interfaces with respect to how the network node 1200 could obtain the definition of the test signal to be transmitted or received by the EUT 210, how the network node 1200 could apply the first beamforming weights, how the network node 1200 could apply the second beamforming weights, and how the network node 1200 could initiate transmission or reception of the test signal over the AAS using the time/frequency resource grid 100 will now be disclosed with reference to the block diagrams of FIGS. 4 to 8. Each of these block diagrams illustrate one respective realization of the network node 1200 and the EUT 210.

Figure 4:
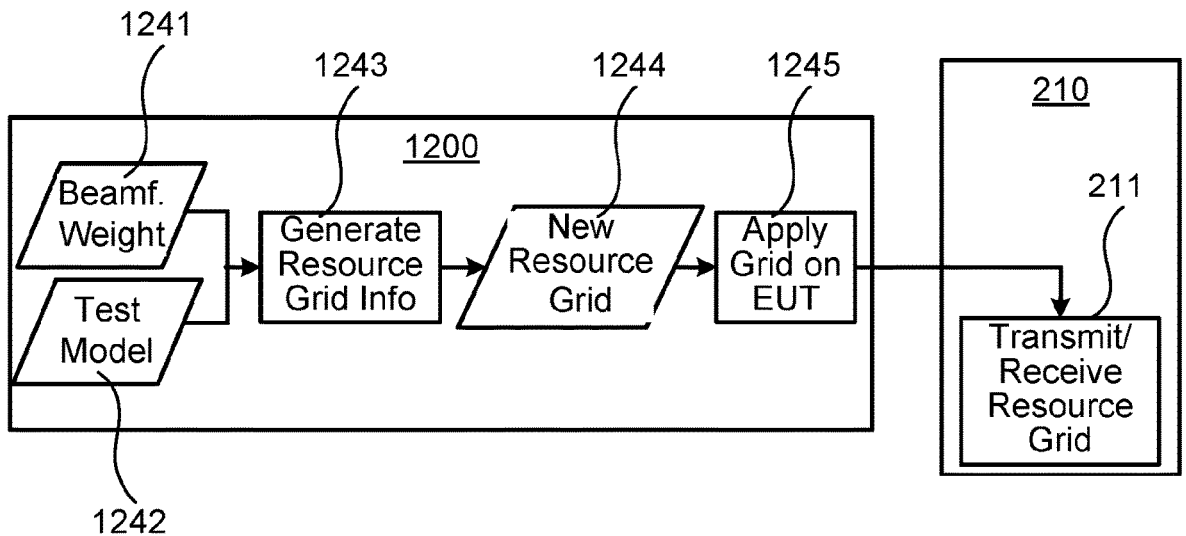
FIGS. 4 to 8 are block diagrams illustrating realizations of a network node and an EUT according to embodiments.

In the realization of FIG. 4, the beamforming weights data block 1241 contains information about one or more beams in terms of beamforming weights. Each of the beams has corresponding amplitude and phase information for each antenna port. Each of the beams has corresponding information about their placement within the resource grid. The test model data block 1242 contains information about the signal to be transmitted by the EUT 210. In the generate resource grid information process block 1243 a time/frequency resource grid 100 to be used is generated. First beamforming weights are applied to first selected resource elements 120 of the time/frequency resource grid 100 as in S104 and second beamforming weights are applied to second selected resource elements 120 of the time/frequency resource grid 100 as in S108. The new resource grid data block 1244 contains the generated time/frequency resource grid 100. In the apply grid on EUT process block 1245 the network node 1200 initiates transmission or reception of the test signal using the time/frequency resource grid 100. In the transmit/receive resource grid process block 211 the test signal is transmitted or received over the AAS using the time/frequency resource grid 100.

Figure 5:
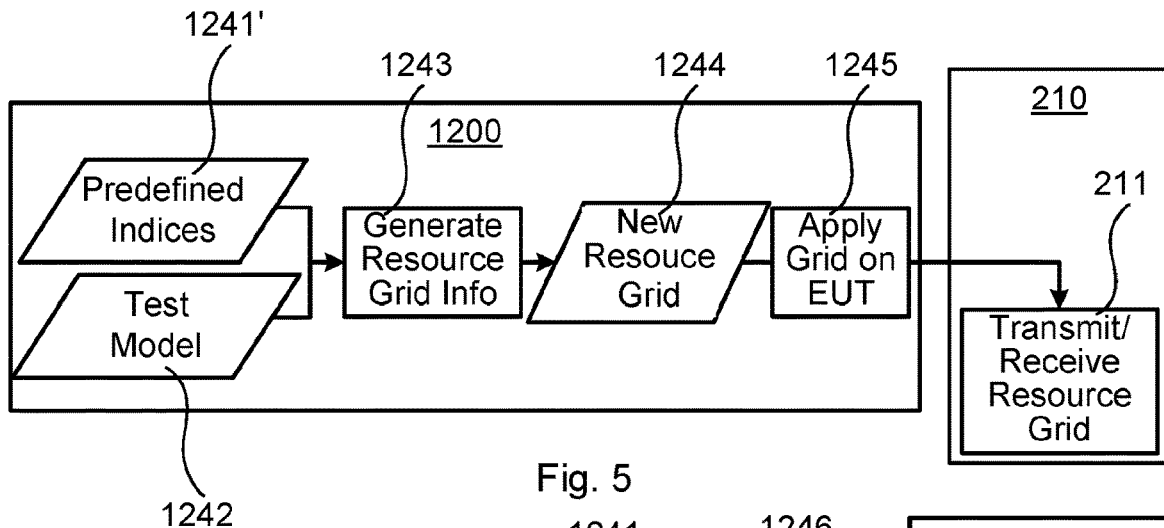

In the realization of FIG. 5, the predefined indices data block 1241' contains information about one or more beams in terms of predefined indices to a beamforming codebook. Each of the beams has corresponding amplitude and phase information for each antenna port. Each of the beams has corresponding information about their placement within the resource grid. The test model data block 1242 contains information about the signal to be transmitted by the EUT 210. In the generate resource grid information process block 1243 a time/frequency resource grid 100 to be used is generated. First beamforming weights are applied to first selected resource elements 120 of the time/frequency resource grid 100 as in S104 and second beamforming weights, as defined by the predefined indices to the beamforming codebook from data block 1241', are applied to second selected resource elements 120 of the time/frequency resource grid 100 as in S108. The new resource grid data block 1244 contains the generated time/frequency resource grid 100. In the apply grid on EUT process block 1245 the network node 1200 initiates transmission or reception of the test signal using the time/frequency resource grid 100. In the transmit/receive resource grid process block 211 the test signal is transmitted or received over the AAS using the time/frequency resource grid 100.

Figure 6:
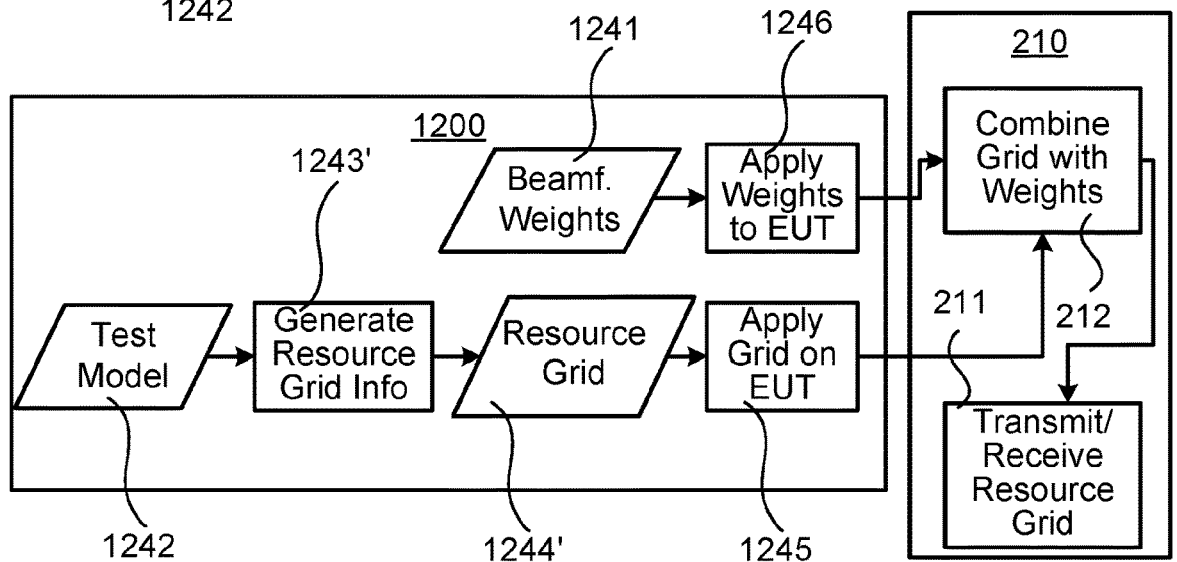

In the realization of FIG. 6, the beamforming weights data block 1241 contains information about one or more beams in terms of beamforming weights. Each of the beams has corresponding amplitude and phase information for each antenna port. Each of the beams has corresponding information about their placement within the resource grid. The test model data block 1242 contains information about the signal to be transmitted by the EUT 210. In the generate resource grid information process block 1243' a time/frequency resource grid 100 to be used is generated. First beamforming weights are applied to first selected resource elements 120 of the time/frequency resource grid 100 as in S104. The resource grid data block 1244' contains the generated time/frequency resource grid 100. In the apply grid on EUT process block 1245 the network node 1200 initiates transmission or reception of the test signal using the time/frequency resource grid 100. In the apply weights to EUT process block 1246 second beamforming weights are applied to second selected resource elements 120 of the time/frequency resource grid 100 as in S108. In the combine grid with weight blocks 212 the time/frequency resource grid 100 defined by process block 1245 is combined with the time/frequency resource grid 100 defined by process block 1246. In the transmit/receive resource grid process block 211 the test signal is transmitted or received over the AAS using the time/frequency resource grid 100.

Figure 7:
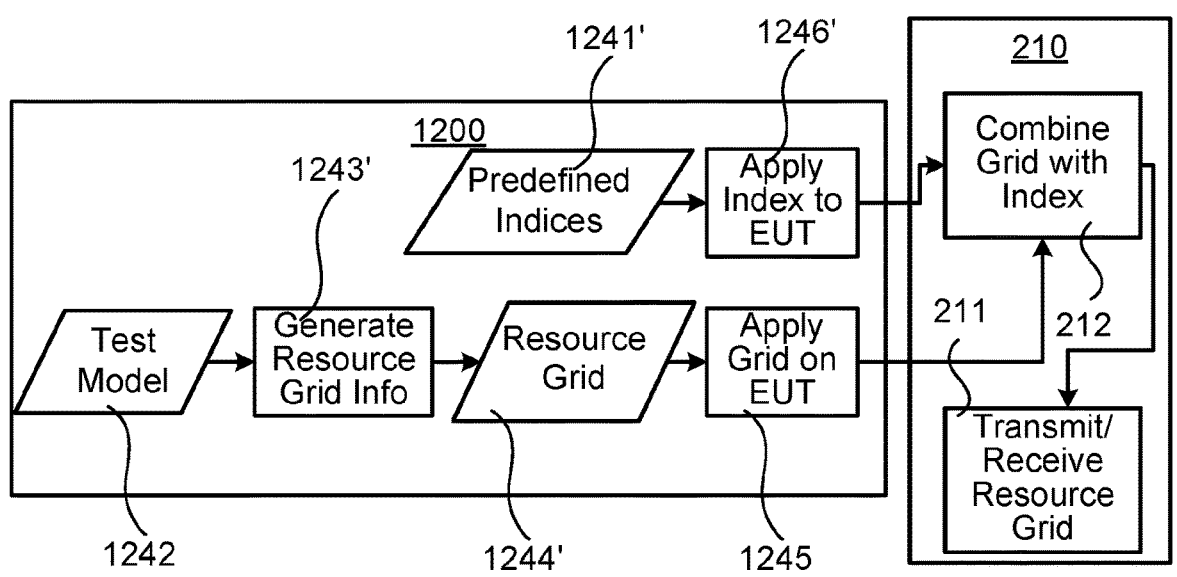

In the realization of FIG. 7, the predefined indices data block 1241' contains information about one or more beams in terms of predefined indices to a beamforming codebook. Each of the beams has corresponding amplitude and phase information for each antenna port. Each of the beams has corresponding information about their placement within the resource grid. The test model data block 1242 contains information about the signal to be transmitted by the EUT 210. In the generate resource grid information process block 1243' a time/frequency resource grid 100 to be used is generated. First beamforming weights are applied to first selected resource elements 120 of the time/frequency resource grid 100 as in S104. The resource grid data block 1244' contains the generated time/frequency resource grid 100. In the apply grid on EUT process block 1245 the network node 1200 initiates transmission or reception of the test signal using the time/frequency resource grid 100. In the apply index to EUT process block 1246' second beamforming weights, as defined by the predefined indices to the beamforming codebook from data block 1241', are applied to second selected resource elements 120 of the time/frequency resource grid 100 as in S108. In the combine grid with weight blocks 212 the time/frequency resource grid 100 defined by process block 1245 is combined with the time/frequency resource grid 100 defined by process block 1246. In the transmit/receive resource grid process block 211 the test signal is transmitted or received over the AAS using the time/frequency resource grid 100.

Figure 8:
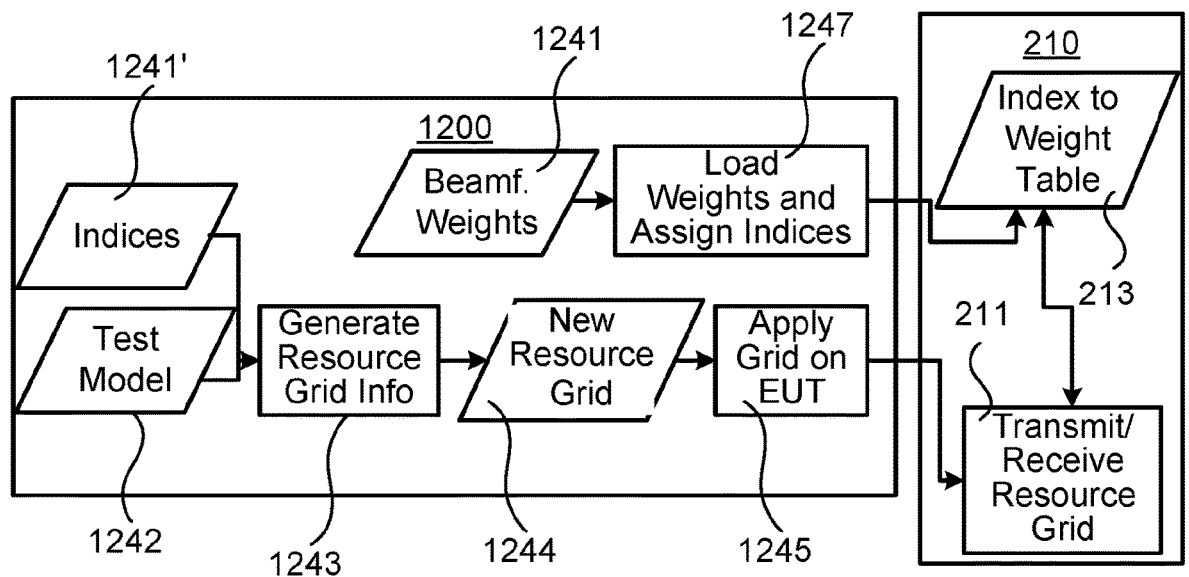

In the realization of FIG. 8, the beamforming weights data block 1241 contains information about one or more beams in terms of beamforming weights, and the predefined indices data block 1241' contains information about one or more beams in terms of predefined indices to a beamforming codebook. Each of the beams has corresponding amplitude and phase information for each antenna port. Each of the beams has corresponding information about their placement within the resource grid. The test model data block 1242 contains information about the signal to be transmitted by the EUT 210. In the generate resource grid information process block 1243 a time/frequency resource grid 100 to be used is generated. First beamforming weights are applied to first selected resource elements 120 of the time/frequency resource grid 100 as in S104 and second beamforming weights, as defined by the predefined indices to the beamforming codebook from data block 1241', are applied to second selected resource elements 120 of the time/frequency resource grid 100 as in S108. The new resource grid data block 1244 contains the generated time/frequency resource grid 100. In the apply grid on EUT process block 1245 the network node 1200 initiates transmission or reception of the test signal using the time/frequency resource grid 100. In the load weights and assign indices process block 1247 the second beamforming weights are intermediately stored. Further, in case the beams are not predefined but must be loaded into the EUT 210, the second beamforming weights can be loaded to the EUT 210 from block 1247. The index to weight table data block 213 contains a look-up table of beam indices pointing out beamforming weights. The index to weight table data block 213 could provide a means to override existing beams or creating new beams, such as when the beams are not predefined but must be loaded into the EUT 210. In the transmit/receive resource grid process block 211 the test signal is transmitted or received over the AAS using the time/frequency resource grid 100.

Figure 9:
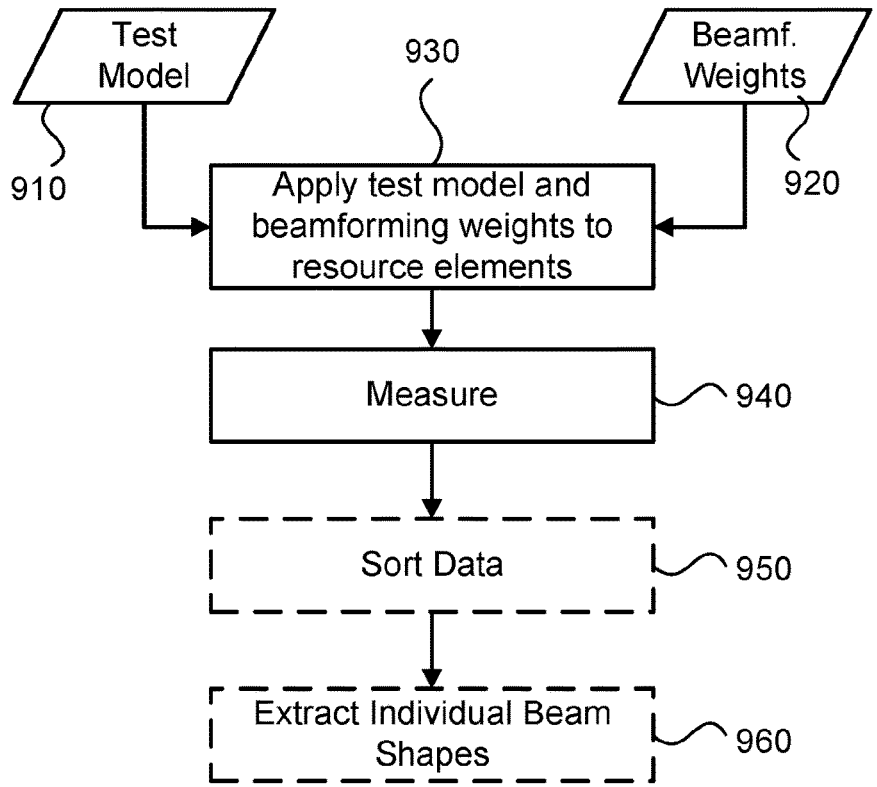
FIG. 9 is a flowchart of methods according to embodiments.

One particular embodiment for OTA testing of an AAS of an EUT 210 as performed by the network node 1200 will now be disclosed with reference to the flowchart of FIG. 9.

The test model data block 910 contains information about the signal to be transmitted by the EUT 210. The resource grid, including the number of resource blocks and symbols for testing, is defined here.

The beamforming weights data block 920 contains information about one or more beams. Each of the beams has corresponding amplitude and phase information for each antenna port. Each of the beams has corresponding information about their placement within the resource grid.

In the apply test model and beamforming weights to resource elements process block 930 the data from the test model and the beamforming weights are combined into one resource grid containing both symbol and beamforming weight information for each resource element in the resource grid. Signals defined by this resource grid are then transmitted by the equipment under test.

In the measure process block 940 data is collected by demodulation of the received signal by the test equipment or the equipment under test, depending on DL/UL configuration. The data comprises the resource grid. Actions performed in this process block can be repeated for any number of angular positions.

In the sort data process block 950, to obtain information for each individual beam, the resource elements containing beam data for each beam is sorted out. This can be one or more resource elements if averaging is desired. If power values representative of the entire carrier are desired, these beams can be scaled using this calculation:

$$\text{carrier power} = RE_{power} \cdot RB_{total} \cdot RB_{subcarriers},$$

where carrier power denotes the carrier power, where $RE_{power}$ denotes the power per resource element, where $RB_{total}$ denotes the number of resource blocks, and where $RB_{subcarriers}$ denotes the number of subcarriers per resource block. As an illustrative numerical example, for a 10 MHz LTE carrier with $RE_{power}$=0.5 W, $RB_{total}$=50, and $RB_{subcarriers}$=12 yields:

$$\text{carrier power} = 0.5W \cdot 50 \cdot 12 = 300W$$

In the extract individual beam shapes process block 960 the beam shapes are extracted using the resource elements containing the beams and the angles at which they were measured.

Figure 10:
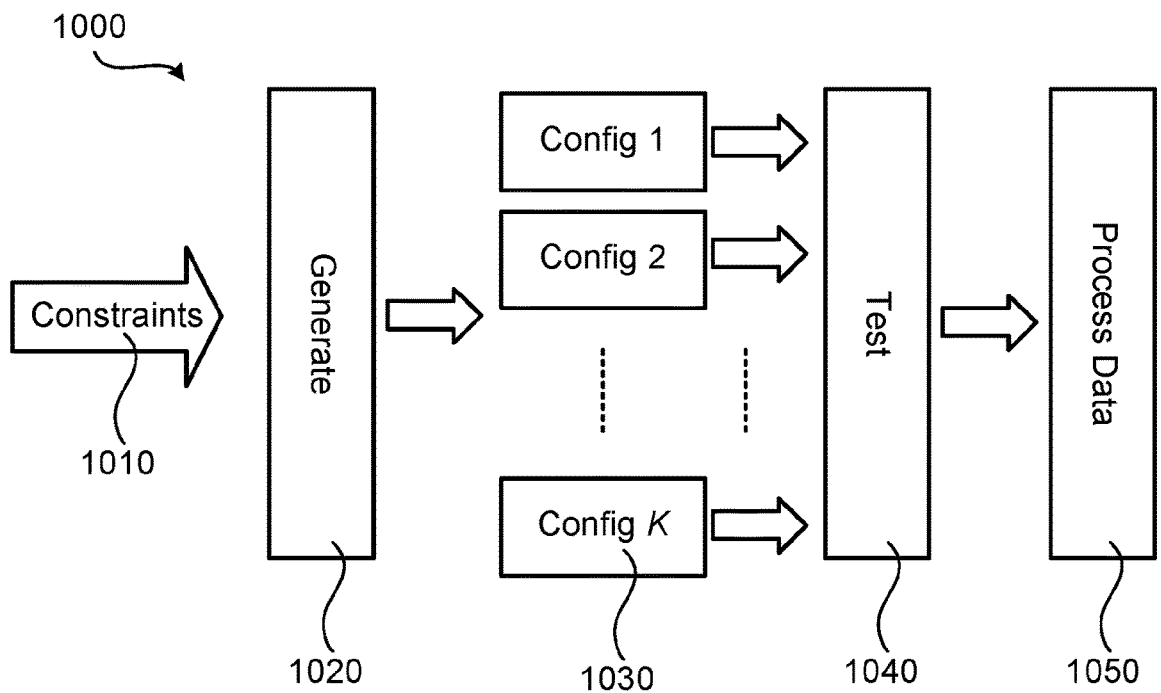
FIG. 10 illustrates, in terms of a block diagram, how OTA testing of K different configurations could be performed according to an example.

FIG. 10 illustrates, in terms of a block diagram 1000, how OTA testing of K different configurations could be performed according to an example. Configuration blocks 1030 contains K second beamforming weights, possibly also test signals and/or first beamforming weights for one or more EUT 210. The K configurations are generated in a generate block 1020 based on constraints 1010. Test block 1040 schematically illustrates the OTA testing of the K different configurations (one or more per EUT 210). Process data block 1050 schematically illustrates the test data, such as IQ values, resulting from the OTA testing of the K different configurations. At least the generate block 1020 might be implemented in a cloud computational environment.

Figure 11:
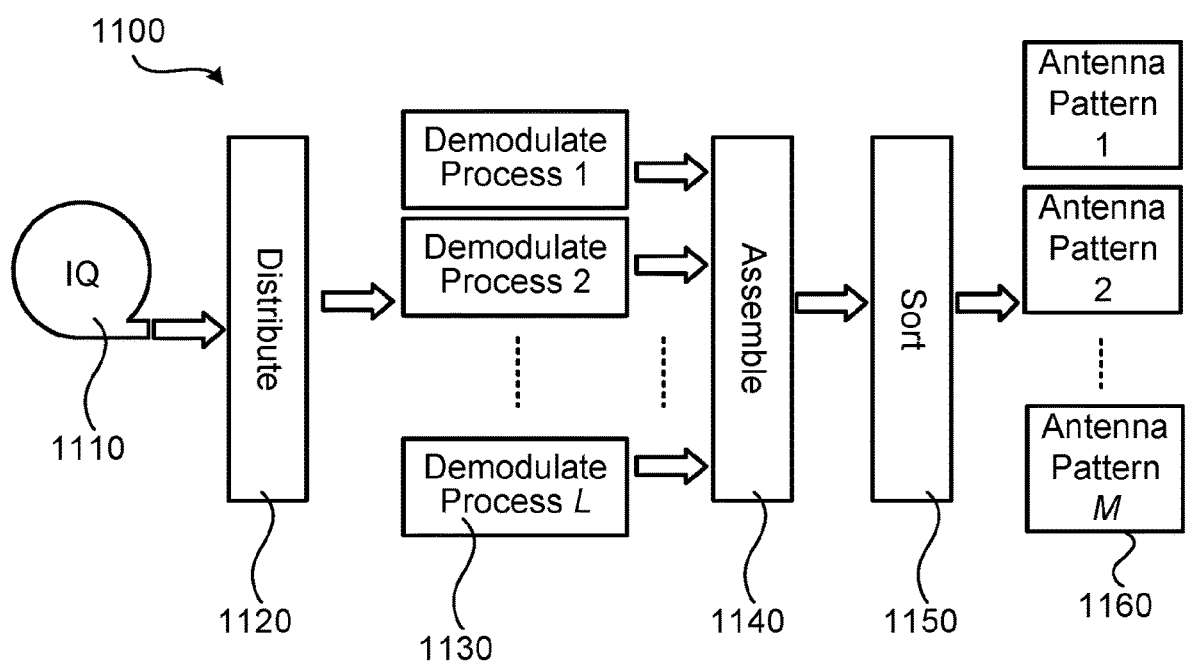
FIG. 11 illustrates, in terms of a block diagram, how analysis of M different antenna patterns for one or more EUTs could be performed according to an example.

FIG. 11 illustrates, in terms of a block diagram 1000, how analysis of M different antenna patterns for one or more EUTs 210 could be performed according to an example. IQ data block 1110 provides test data, in terms of IQ values, resulting from OTA testing (such as of one or more different configurations as obtained in process data block 1050 of FIG. 10). Distribute block 1120 distribute the IQ values to L demodulation process blocks 1130. Each of the L demodulation process blocks 1130 demodulates its received IQ values. Assemble block 1140 assembles all the demodulated to a sequences of IQ values. Sort block 1150 sorts the assembled sequences of IQ values per antenna pattern, resulting in M sorted sequences of assembled IQ values. Antenna pattern block 1160 generates one antenna patterns per each of the sorted sequences of assembled IQ values, resulting in M antenna patterns. The blocks 1120:1160 might be implemented in a cloud computational environment.

Figure 12:
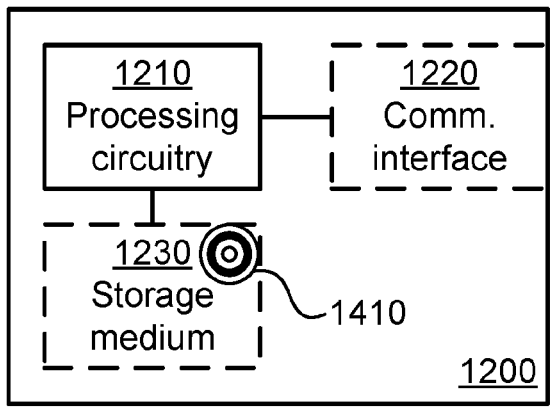
FIG. 12 is a schematic diagram showing functional units of a network node according to an embodiment.

FIG. 12 schematically illustrates, in terms of a number of functional units, the components of a network node 1200 according to an embodiment. Processing circuitry 1210 is provided using any combination of one or more of a suitable central processing unit (CPU), multiprocessor, microcontroller, digital signal processor (DSP), etc., capable of executing software instructions stored in a computer program product 1410 (as in FIG. 14), e.g. in the form of a storage medium 1230. The processing circuitry 1210 may further be provided as at least one application specific integrated circuit (ASIC), or field programmable gate array (FPGA).

Particularly, the processing circuitry 1210 is configured to cause the network node 1200 to perform a set of operations, or steps, as disclosed above. For example, the storage medium 1230 may store the set of operations, and the processing circuitry 1210 may be configured to retrieve the set of operations from the storage medium 1230 to cause the network node 1200 to perform the set of operations. The set of operations may be provided as a set of executable instructions.

Thus the processing circuitry 1210 is thereby arranged to execute methods as herein disclosed. The storage medium 1230 may also comprise persistent storage, which, for example, can be any single one or combination of magnetic memory, optical memory, solid state memory or even remotely mounted memory. The network node 1200 may further comprise a communications interface 1220 at least configured for communications with other entities, functions, nodes, and devices, such as at least the EUT 210. As such the communications interface 1220 may comprise one or more transmitters and receivers, comprising analogue and digital components. The processing circuitry 1210 controls the general operation of the network node 1200 e.g. by sending data and control signals to the communications interface 1220 and the storage medium 1230, by receiving data and reports from the communications interface 1220, and by retrieving data and instructions from the storage medium 1230. Other components, as well as the related functionality, of the network node 1200 are omitted in order not to obscure the concepts presented herein.

Figure 13:
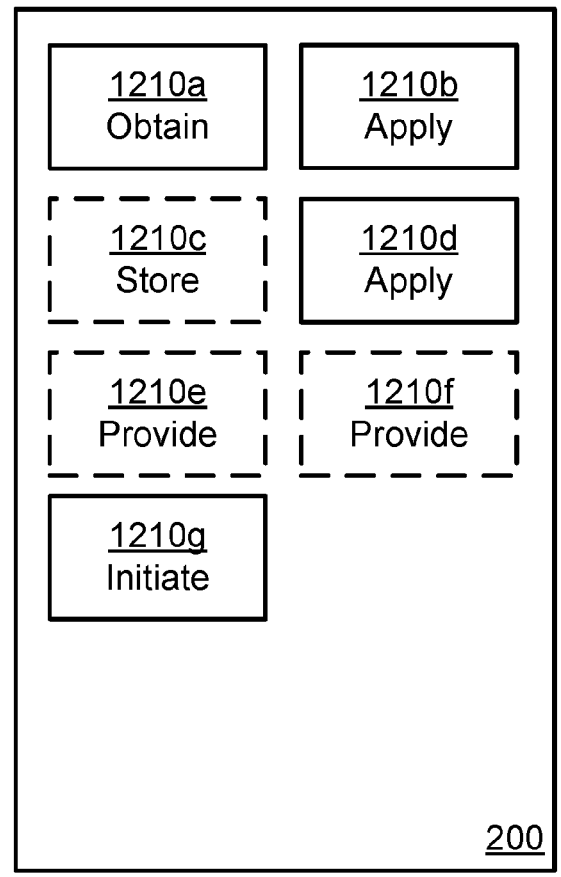
FIG. 13 is a schematic diagram showing functional modules of a network node according to an embodiment.

FIG. 13 schematically illustrates, in terms of a number of functional modules, the components of a network node 1200 according to an embodiment. The network node 1200 of FIG. 13 comprises a number of functional modules; an obtain module 1210a configured to perform step S102, a first apply module 1210b configured to perform step S104, a second apply module 1210d configured to perform step S108, and an initiate module 1210g configured to perform step S114. The network node 1200 of FIG. 13 may further comprise a number of optional functional modules, such as any of a store module 1210c configured to perform step S106, a first provide module 1210e configured to perform step S110, and a second provide module 1210f configured to perform step S112. In general terms, each functional module 1210a: 1210g may in one embodiment be implemented only in hardware and in another embodiment with the help of software, i.e., the latter embodiment having computer program instructions stored on the storage medium 1230 which when run on the processing circuitry makes the network node 1200 perform the corresponding steps mentioned above in conjunction with FIG. 13. It should also be mentioned that even though the modules correspond to parts of a computer program, they do not need to be separate modules therein, but the way in which they are implemented in software is dependent on the programming language used. Preferably, one or more or all functional modules 1210a: 1210g may be implemented by the processing circuitry 1210, possibly in cooperation with the communications interface 1220 and/or the storage medium 1230. The processing circuitry 1210 may thus be configured to from the storage medium 1230 fetch instructions as provided by a functional module 1210a: 1210g and to execute these instructions, thereby performing any steps as disclosed herein.

The network node 1200 may be provided as a standalone device or as a part of at least one further device. For example, the network node 1200 may be provided in a node of a (radio) access network or in a node of a core network. Alternatively, functionality of the network node 1200 may be distributed between at least two devices, or nodes. These at least two nodes, or devices, may either be part of the same network part (such as the (radio) access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 1200 may be executed in a first device, and a second portion of the of the instructions performed by the network node 1200 may be executed in a second device; the herein disclosed embodiments are not limited to any particular number of devices on which the instructions performed by the network node 1200 may be executed. Hence, the methods according to the herein disclosed embodiments are suitable to be performed by a network node 1200 residing in a cloud computational environment. Therefore, although a single processing circuitry 1210 is illustrated in FIG. 12 the processing circuitry 1210 may be distributed among a plurality of devices, or nodes. The same applies to the functional modules 1210a: 1210g of FIG. 13 and the computer program 1420 of FIG. 14.

Figure 14:
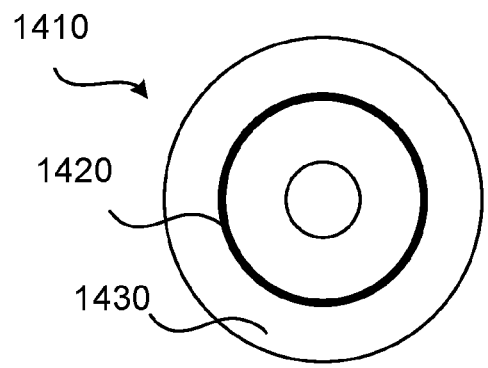
FIG. 14 shows one example of a computer program product comprising computer readable storage medium according to an embodiment.

FIG. 14 shows one example of a computer program product 1410 comprising computer readable storage medium 1430. On this computer readable storage medium 1430, a computer program 1420 can be stored, which computer program 1420 can cause the processing circuitry 1210 and thereto operatively coupled entities and devices, such as the communications interface 1220 and the storage medium 1230, to execute methods according to embodiments described herein. The computer program 1420 and/or computer program product 1410 may thus provide means for performing any steps as herein disclosed.

In the example of FIG. 14, the computer program product 1410 is illustrated as an optical disc, such as a CD (compact disc) or a DVD (digital versatile disc) or a Blu-Ray disc. The computer program product 1410 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420 is here schematically shown as a track on the depicted optical disk, the computer program 1420 can be stored in any way which is suitable for the computer program product 1410.

Figure 15:
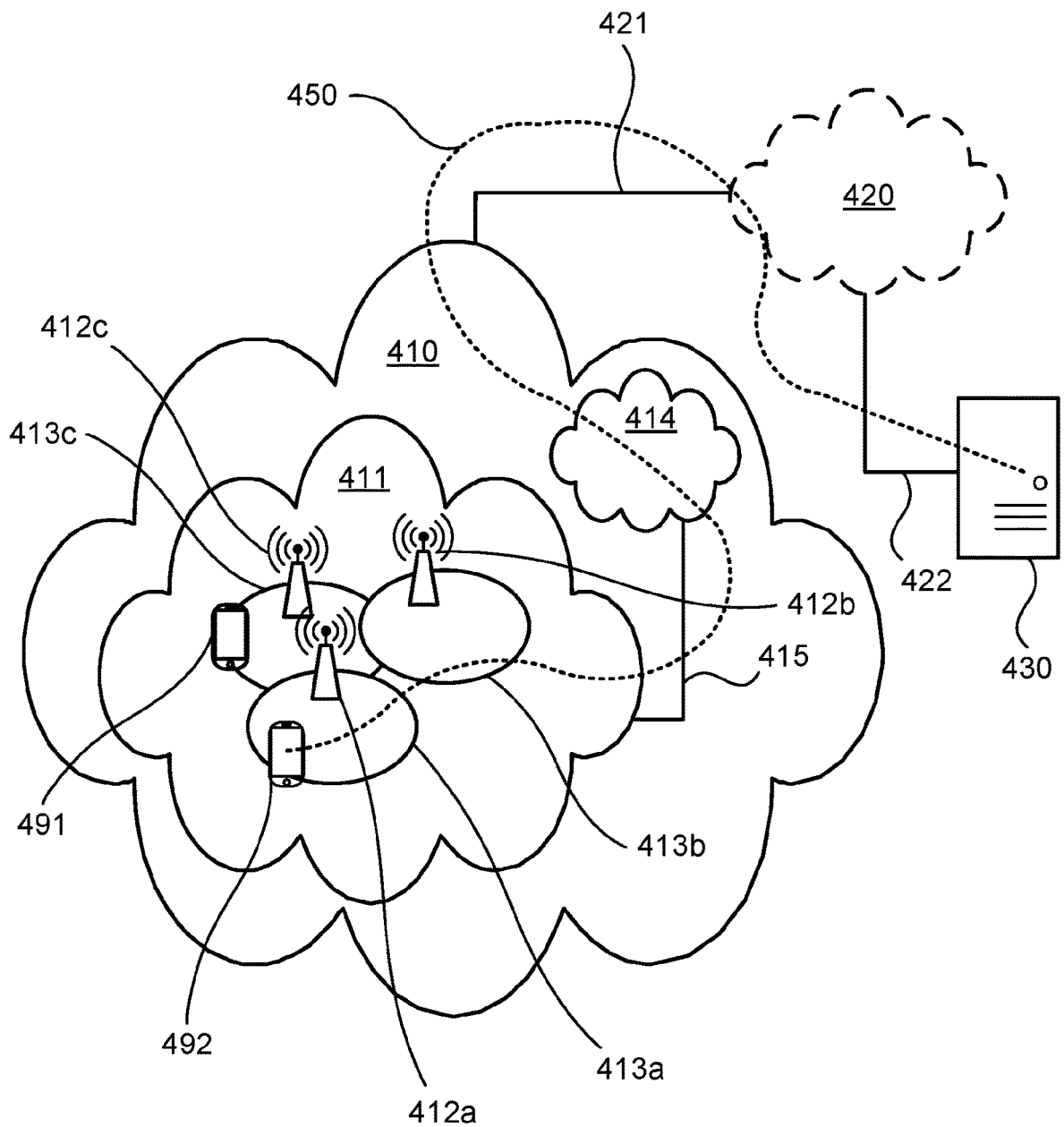
FIG. 15 is a schematic diagram illustrating a telecommunication network connected via an intermediate network to a host computer in accordance with some embodiments.

FIG. 15 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. Access network 411 comprises a plurality of (radio) access network nodes 412a, 412b, 412c, such as NBs, eNBs, gNBs or other types of wireless access points, each defining a corresponding coverage area, or cell, 413a, 413b, 413c. Each (radio) access network nodes 412a, 412b, 412c is connectable to core network 414 over a wired or wireless connection 415. A first UE 491 located in coverage area 413c is configured to wirelessly connect to, or be paged by, the corresponding (radio) access network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The EUT 210 might be part of, either one or more of the access network nodes 412a, 412b, 412c, or one or more of the UEs 491, 492.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491, Similarly, network node 412 need not be aware of the future routing of an outgoing uplink communication originating from the UE 491 towards the host computer 430.

Figure 16:
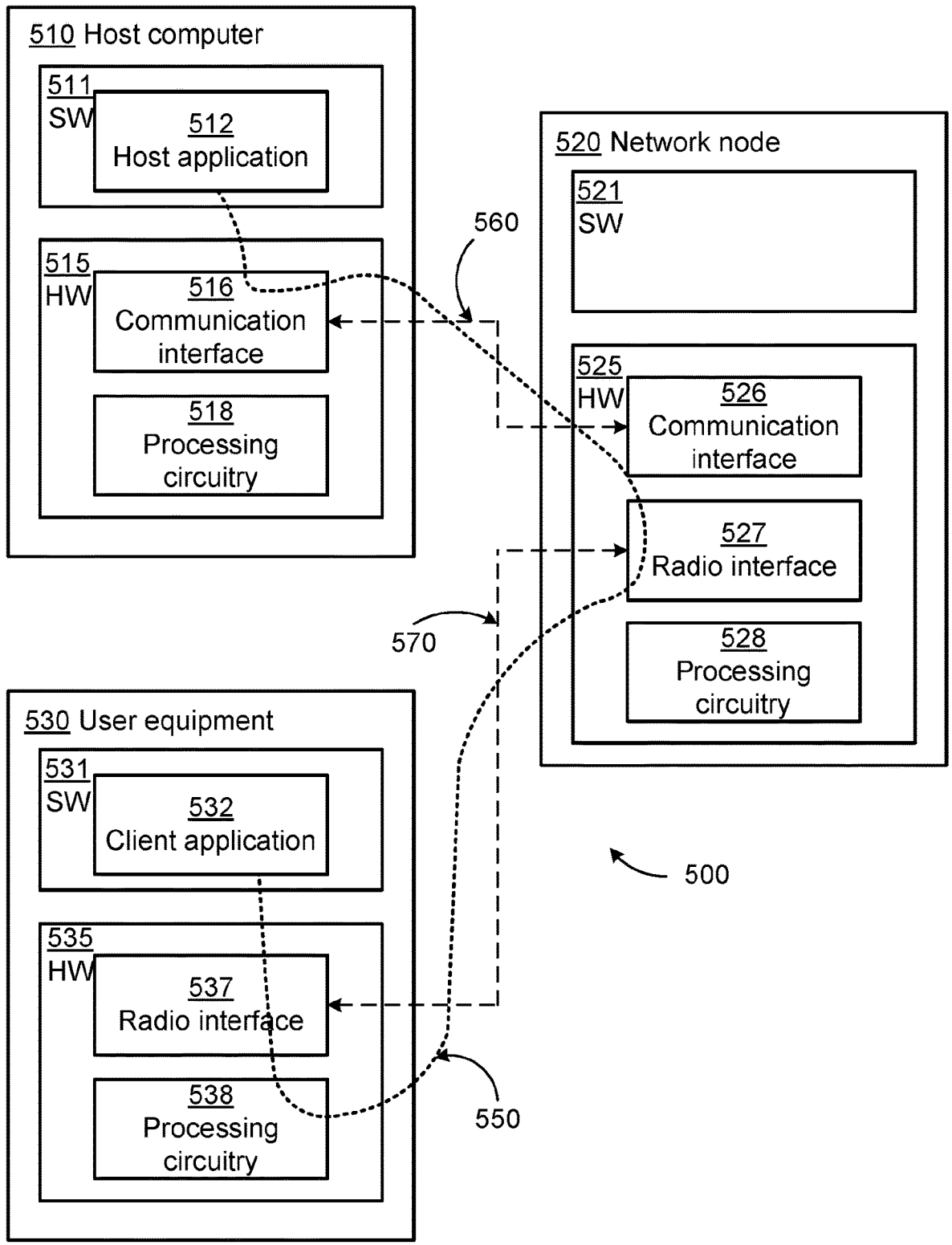
FIG. 16 is a schematic diagram illustrating host computer communicating via a radio base station with a terminal device over a partially wireless connection in accordance with some embodiments.

FIG. 16 is a schematic diagram illustrating host computer communicating via a (radio) access network node with a UE over a partially wireless connection in accordance with some embodiments. Example implementations, in accordance with an embodiment of the UE. (radio) access network node and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes (radio) access network node 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by (radio) access network node 520. Communication interface 526 may be configured to facilitate connection 560 to host computer 510. Connection 560 may be direct or it may pass through a core network (not shown in FIG. 16) of the telecommunication system and/or through one or more intermediate networks outside the telecommunication system. In the embodiment shown, hardware 525 of (radio) access network node 520 further includes processing circuitry 528, which may comprise one or more programmable processors, application-specific integrated circuits, field programmable gate arrays or combinations of these (not shown) adapted to execute instructions. Access network node 520 further has software 521 stored internally or accessible via an external connection.

Communication system 500 further includes UE 530 already referred to. Its hardware 535 may include radio interface 537 configured to set up and maintain wireless connection 570 with a (radio) access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510. (radio) access network node 520 and UE 530 illustrated in FIG. 16 may be similar or identical to host computer 430, one of (radio) access network nodes 412a, 412b, 412c and one of UEs 491, 492 of FIG. 15, respectively. This is to say, the inner workings of these entities may be as shown in FIG. 16 and independently, the surrounding network topology may be that of FIG. 15. Thus, the EUT 210 might be part of, either access network node 520, or UE 530.

In FIG. 16. OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and (radio) access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to (radio) access network node 520. Such procedures and functionalities may be known and practiced in the art. In certain embodiments, measurements may involve proprietary UE signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for over-the-air, OTA, testing of an active antenna system, AAS, of an equipment under test, EUT, the method being performed by a network node, the method comprising:

obtaining definition of a test signal to be transmitted or received by the EUT in accordance with a time/frequency resource grid;

applying first beamforming weights to first selected resource elements of the time/frequency resource grid that give first beam directions according to a first type of configuration for first OTA testing of the AAS;

applying second beamforming weights to second selected resource elements of the time/frequency resource grid that give second beam directions according to a second type of configuration for second OTA testing of the AAS, the first type of configuration being a default configuration for default OTA testing of the AAS and the second type of configuration being a custom configuration for custom OTA testing of the AAS; and initiating transmission or reception of the test signal over the AAS using the time/frequency resource grid.

2. The method according to claim 1, wherein the test signal is, in accordance with the first beamforming weights and the second beamforming weights, transmitted or received in beams, and wherein the test signal as transmitted or received in each of the beams contains information about which resource elements that are used by which beamforming weights within the time/frequency resource grid.

3. The method according to claim 2, wherein the test signal is transmitted or received on antenna ports of the AAS, wherein the first beamforming weights and the second beamforming weights are defined in terms of amplitude and phase information, and wherein the test signal as transmitted or received in each of the beams contains the amplitude and phase information for each of the antenna ports.

4. The method according to claim 1, wherein the second beamforming weights are defined by an index to a beamforming codebook or determined from measurements on received reference signals.

5. The method according to claim 1, wherein the second beamforming weights are applied to the second selected resource elements representing CRS symbols, CSI-RS symbols and PDSCH symbols, or SSB, or to the second selected resource elements representing broadcast symbols.

6. The method according to claim 1, wherein the test signal is transmitted or received in frames, and wherein the second beamforming weights applied to the second selected resource elements representing PDSCH symbols differ from frame to frame.

7. The method according to claim 1, wherein the method further comprises:

providing information identifying the second selected resource elements of the time/frequency resource grid to a test equipment, TE, intended to receive or transmit the test signal.

8. The method according to claim 1, wherein the EUT is configured for either time-division duplex, TDD, operation or frequency-division duplex, FDD, operation, or a combination of TDD operation and FDD operation.

9. The method according to claim 1, wherein the time/frequency resource grid is for the transmission or reception of the test signal over a Long Term Evolution, LTE, air interface, a New Radio, NR, air interface, or a Universal Mobile Telecommunications Service, UMTS, air interface.

10. The method according to claim 1, wherein the EUT is, or is part of, either an access network node or a user equipment.

11. The method according to claim 1, wherein the method further comprises:

storing the second beamforming weights and their association to the first selected resource elements.

12. The method according to claim 1, wherein the method further comprises:
   providing time synchronization information regarding the transmission or reception of the test signal over the AAS to a test chamber controller of a test chamber in which the test signal is intended to be transmitted or received.

13. The method according to claim 1, wherein the test signal is, in accordance with the first beamforming weights and the second beamforming weights, transmitted or received in beams, and wherein the test signal as transmitted or received in each of the beams contains information about which resource elements that are used by which beamforming weights within the time/frequency resource grid.

14. The method according to claim 1, wherein the second beamforming weights are defined by an index to a beamforming codebook or determined from measurements on received reference signals.

15. The method according to claim 1, wherein the second beamforming weights are applied to the second selected resource elements representing CRS symbols, CSI-RS symbols and PDSCH symbols, or SSB, or to the second selected resource elements representing broadcast symbols.

16. The method according to claim 1, wherein the test signal is transmitted or received in frames, and wherein the second beamforming weights applied to the second selected resource elements representing PDSCH symbols differ from frame to frame.

17. A network node for over-the-air, OTA, testing of an active antenna system, AAS, of an equipment under test, EUT, the network node comprising processing circuitry, the processing circuitry being configured to cause the network node to:
   obtain definition of a test signal to be transmitted or received by the EUT in accordance with a time/frequency resource grid;
   apply first beamforming weights to first selected resource elements of the time/frequency resource grid that give first beam directions according to a first type of configuration for first OTA testing of the AAS;
   apply second beamforming weights to second selected resource elements of the time/frequency resource grid that give second beam directions according to a second type of configuration for second OTA testing of the AAS, the first type of configuration being a default configuration for default OTA testing of the AAS and the second type of configuration being a custom configuration for custom OTA testing of the AAS; and
   initiate transmission or reception of the test signal over the AAS using the time/frequency resource grid.

18. A non-transitory computer program storage medium storing a computer program for over-the-air, OTA, testing of an active antenna system, AAS, of an equipment under test, EUT, the computer program comprising computer code which, when run on processing circuitry of a network node, causes the network node to:
   obtain definition of a test signal to be transmitted or received by the EUT in accordance with a time/frequency resource grid;
   apply first beamforming weights to first selected resource elements of the time/frequency resource grid that give first beam directions according to a first type of configuration for first OTA testing of the AAS;
   apply second beamforming weights to second selected resource elements of the time/frequency resource grid that give second beam directions according to a second type of configuration for second OTA testing of the AAS, the first type of configuration being a default configuration for default OTA testing of the AAS and the second type of configuration being a custom configuration for custom OTA testing of the AAS; and
   initiate transmission or reception of the test signal over the AAS using the time/frequency resource grid.

* * * * *